United States Patent

DiMatteo

[19]

[11] Patent Number: 6,084,173
[45] Date of Patent: Jul. 4, 2000

[54] METHOD AND APPARATUS FOR THE GENERATION OF CHARGED CARRIERS IN SEMICONDUCTOR DEVICES

[76] Inventor: Robert Stephen DiMatteo, 85 Walnut Ct., Stoughton, Mass. 02072

[21] Appl. No.: 08/902,817

[22] Filed: Jul. 30, 1997

[51] Int. Cl.[7] ..................................................... H01L 35/00

[52] U.S. Cl. ........................... 136/201; 136/223; 136/253

[58] Field of Search .................................... 136/223, 200, 136/201, 203, 205, 253

[56] References Cited

U.S. PATENT DOCUMENTS 5,651,838  7/1997  Fraas et al. .............................. 136/253

*Primary Examiner*—Kathryn Gorgos
*Assistant Examiner*—Thomas H. Parsons
*Attorney, Agent, or Firm*—Rines and Rines

[57] ABSTRACT

A technique for enhancing the generation of carriers (ex. electrons and/or holes) in semiconductor devices such as photovoltaic cells and the like, receiving radiation from a heated surface, through the use of micron juxtaposition of the surface of the device and the heated surface and with the gap thereinbetween preferably evacuated.

15 Claims, 1 Drawing Sheet

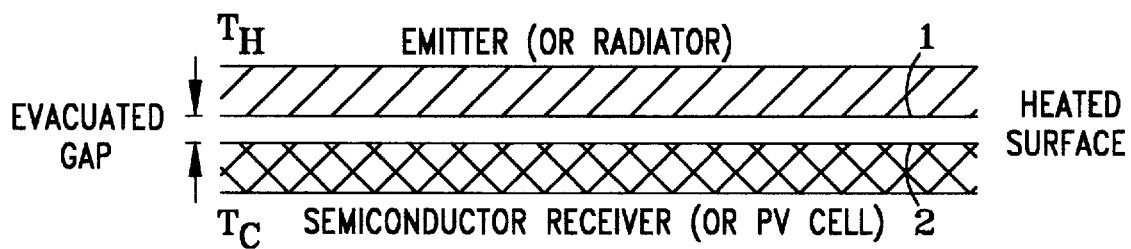

METHOD AND APPARATUS FOR THE GENERATION OF CHARGED CARRIERS IN SEMICONDUCTOR DEVICES

BACKGROUND OF THE INVENTION

1. Field of the Invention

The present invention relates to the general area of generating carriers such as electrons and holes within semiconductors by the action of incident radiation, being more particularly concerned with radiation emanating from heated surfaces, and, in an important application, to the enhancement of such generation within photovoltaic devices and the like, due to the close proximity of the heated surface.

2. Description of the Prior Art

In a common photovoltaic cell, a semiconductor p-n junction is formed close to the surface of the semiconductor material that forms the cell. When photons emitted by a light source such as the sun impinge on the cell surface, electron-hole pairs are created. These electron-hole pairs are separated by the space-charge potential that is a consequence of the p-n junction. The net result is a DC current. Thermophotovoltaics operate in a similar manner except that, instead of a light source, a surface at a higher temperature than the semiconductor material acts as the source of photons. In this case, thermal radiation is the mechanism of energy transfer and the temperature of the emitting surface which dictates the spectral composition of the radiation must be matched to the material and electronic properties of the semiconductor such as its bandgap in order to optimize conversion efficiency.

Prior thermophotovoltaic devices and systems have been designed such that the distance between the emitting surface and the cell surface is large relative to the characteristic wavelength of the thermal radiation. Hence, the thermal radiation transfer is characterized by the Stefan-Boltzmann Law and its spectral composition by Planck's law.

Microscale Radiative Heat Transfer

Turning now from the field of semiconductor devices, including photovoltaic cells and the like, to the general field of radiative heat transfer, in the classical theory of radiative heat transfer, the radiated power per area and per interval of wavelength of a flat surface in thermal equilibrium with its surrounding is given by Planck's Law. Integration of Planck's Law over all wavelengths yields the Stefan-Boltzman Law for black surfaces. Similarly, this law governs the exchange of energy between two black surfaces.

Planck's law predicts that a large portion of the radiative energy at a given temperature of the radiating body will be around the wavelength of greatest spectral intensity "lambdamax". "Lambdamax" is predicted by the Wien Displacement Law. At shorter wavelengths the power falloff is very rapid whereas at wavelengths greater than lambdamax the falloff is much more gradual. At lower temperatures, lambdamax occurs at longer wavelengths.

In the above classical theory, it is assumed that the distances between radiating surfaces all large compared to the wavelengths of the energy involved. Planck himself imposed this condition on his derivation. Over the last several decades, a small segment of radiative heat transfer theory and experimentation has developed wherein the spaces between radiating solids are on the order of and smaller than the characteristic wavelengths of the radiation exchanged. There is experimental evidence to show that the energy exchange between two surfaces (dielectric to dielectric or metal to metal) separated by a distance of the same order as the wavelength or less can be several times larger than at larger distances, and that the magnitude of this effect increases sharply with decreasing distance. Examples of such experiments are Cravalho, E. G. et. al., November 1967, "Effect of Small Spacings on Radiative Transfer Between Dielectrics", *Journal of Heat Transfer*, pp.351–358; Hargreaves, C. M., 1973, "Radiative Transfer Between Closely Spaced Bodies", *Philips Res. Reports* Supplement No.5, pp. 1–80; and Kutateladze, S. S., et. al., August 1978, "Effect of Magnitude of Gap Between Metal Plates on their Thermal Interaction at Cryogenic Temperatures", *Sov. Phys. Dokl.* 23(8), pp.577–578. Orders of magnitude increase with very small or "microscale" spacings were theoretically predicted by Polder, D. et. al., November 1971, "Theory of Radiative Heat Transfer between Closely Spaced Bodies", *Physical Review B*, Vol. 4, No. 10, pp.3303–3314 and Levin, M. L. et. al., 1980, "Contribution to the Theory of Heat Exchange Due to a Fluctuating Electromagnetic Field", *Sov. Phys. JETP*, Vol. 6, pp.1054–1063.

Underlying the present invention, is my novel conceptual insight and discovery that these previously unrelated technologies of thermophotovoltaic energy conversion and of small spacing radiative heat transfer systems could synergistically be combined in such a manner as to enhance the generation of semiconductor carriers (electrons and holes) in semiconductor devices such as photovoltaic cells and the like, receiving radiation, such as photons, from a heated surface, through the use of very small gap juxtaposition of the surfaces of the device and the heated surface.

SUMMARY OF THE INVENTION

A primary object of the invention accordingly, is to provide a new and improved method of enhancing the generation of carriers (ex. electrons and/or holes) in semiconductor devices and near their surfaces, receiving radiation from a heated surface, through the use of very small gap ("microscale") juxtaposition of the surface of the semiconductor surface or device and the heated surface.

A further object is to provide an improved thermophotovoltaic system.

Other and further objects will be explained hereinafter and will be more particularly delineated in the appended claims.

In summary, from one of its broader aspects, the invention embraces a method of enhancing the generation of carriers in a semiconductor near its surface receiving radiation from a heated surface, that comprises, placing the surfaces in juxtaposition, and adjusting the space therebetween to micron scale separation.

Preferred and best mode designs and implementations will later be detailed.

BRIEF DESCRIPTION OF THE DRAWING

The schematic FIGURE illustrates the novel principles of the invention as applied to an exemplary application of a thermophotovoltaic device.

DETAILED DESCRIPTION OF THE INVENTION

The invention will now be described in connection with the accompanying drawing.

Referring to the drawing, a heated surface emitter of radiation, including photons, is schematically shown at 1 in the form of a substantially planar hot surface at temperature $T_H$, juxtaposed in accordance with the present invention, in very close proximity to a substantially parallel surface 2 of a semiconductor receiver of the radiation, such as a photovoltaic cell of relatively cool temperature of $T_C$. Cell current collection contacts and grid (not shown) would be provided in the bottom or back surface or recessed from the front active surface of the cell.

The enhanced synergistic effect of the invention in terms of significant increases in carrier generation in response to the incident radiation from heated surface 1 is achieved by effecting the above mentioned critical close proximity of the surfaces 1 and 2 with a micro gap, having the well-known inherent properties of being both thermally insulative and capable of transmitting or coupling radiation with little loss, (Evacuated Gap) on the order of 0.01 microns up to the order of about 1 micron and in some cases of longer wavelengths (as in cryogenic applications and the like) even up to the order of 100 microns, 0.01–20 microns being a preferred range for most applications.

The fine adjustment of the crucial micron range separation gap between the surfaces 1 and 2 may be controlled by such devices as piezoelectric controlled leveling stages or the like such as the Model 8095 of New Focus Corporation.

In view of the very small gap, moreover, vibration isolation may be required as by conventional isolation tables and the like.

While the invention has been described in connection with the example of a photovoltaic semiconductor device, it is evident that the carrier enhancement effect from close juxtaposition of a semiconductor surface and a heated surface is generically applicable and useful.

Instead of flat surfaces, patterns may be etched or otherwise formed into three-dimensional forms (channels, islands, etc.) to tailor the electromagnetic spectrum of the radiant energy being transferred to the juxtaposed semiconductor surface. There may then be a natural progression from one dimension, MTPV, ie. controlling the distance between two surfaces, to three dimensions wherein in addition to the Microscale spacing, the properties of the surfaces as a function of the two lateral dimensions are also controlled. In summary, if x and y are in the plane of the Emitter and Receiver chip surfaces and z is perpendicular to them, then the degrees of freedom are: z between the chips, z within one or both chips, x and y within one or both chips, and x and y of one chip relative to the other.

Semiconductors include Si and binary, ternary, and quaternary compound semiconductors including InAs, InGaAs, and InGaAsSb and others.

The heated surface, moreover, may not only involve lattice and carriers at the same temperature, but also conditions where the carriers are at a hotter temperature than the lattice ("hot electrons") as through absorption of electromagnetic energy.

Further modifications will also occur to those skilled in this art, and as such are considered to fall within the spirit and scope of the this invention as defined in the appended claims.

What is claimed is:

1. A method of enhancing the generation of electrical currents in a conductive or semi-conductive surface receiving radiation from a heated surface, that comprises, emitting radiation from a heated surface of temperature $T_H$; coupling the radiation through an evacuated gap for reception by a relatively cool conductive or semi-conductive surface maintained at temperature $T_C$, where $T_H > T_C$; and adjusting the spacing of the gap to the order of submicrons/microns to achieve an enhanced increase in the relatively cool surface generation of electrical currents in response to the radiation coupled through the gap.

2. A method as claimed in claim 1 wherein the gap spacing is adjusted to the order of from about 0.01 to 100 microns.

3. A method as claimed in claim 1 wherein a semiconductor surface is provided with photovoltaic properties, and maintained relatively cool with respect to the heated surface.

4. A method as claimed in claim 3 wherein each of the photovoltaic and heated surfaces are formed as substantially planar surfaces, placed in juxtaposition substantially in parallel.

5. A method as claimed in claim 4 wherein, prior to the juxtaposition placing, a step is performed of patterning one or both of the juxtaposed surfaces.

6. A method as claimed in claim 4 wherein, prior to the juxtaposition placing, a step is performed of varying the properties of one or more of the surfaces in dimensions orthogonal to and parallel to said spacing.

7. The method as claimed in claim 1 wherein, prior to said emitting of radiation and said adjusting, a step is performed of providing said semiconductor surface with photovoltaic properties.

8. The method claimed in claim 1 wherein the magnitude of the electrical currents generated is controlled by the adjustment of the gap.

9. The method of claim 8 wherein the energy enhancement achieved by the submicron/micron gap adjustment creates energy stimulation that is converted into the enhanced generation of the electrical currents.

10. The method of claim 9 wherein the relatively cool surface is a photovoltaic surface and the enhanced generation of the electrical currents manifests itself in the power output of the photovoltaic surface.

11. A method of enhancing the generation of carriers in a semiconductor surface receiving radiation from a heated surface, that comprises emitting radiation from a heated surface of temperature $T_H$, coupling the radiation through an evacuated gap for reception by a relatively cool semiconductor surface maintained at temperature $T_C$, where $T_H > T_C$; and adjusting the spacing of the gap to the order of submicrons/microns to achieve an enhanced increase in the semiconductor generation of charged carriers in response to the radiation coupled through the gap, wherein one or both of the heated and semiconductor surfaces is formed for tailoring the spectrum of the emitted radiation coupled through the gap.

12. The method as claimed in claim 11, wherein the forming is provided along one or more of the X, Y and Z axes of either or both surfaces.

13. The method as claimed in claim 11 wherein, prior to said adjusting, providing either or both of the surfaces with one of patterns, channels, islands and three-dimensional forms.

14. A method of enhancing the generation of carriers in a semiconductor surface receiving radiation from a heated surface, that comprises, emitting radiation from a heated surface of temperature $T_H$, coupling the radiation through an evacuated gap for reception by a relatively cool semiconductor surface maintained at temperature $T_C$, where $T_H > T_C$; and adjusting the spacing of the gap to the order of submicrons/microns to achieve an enhanced increase in the semiconductor generation of charged carriers in response to the radiation coupled through the gap, wherein the submicron/micron spacing is adjusted by controlling the leveling of the surfaces.

15. A method of enhancing the generation of carriers in a semiconductor surface receiving radiation from a heated surface, that comprises, emitting radiation from a heated surface of temperature $T_H$, coupling the radiation through an evacuated gap for reception by a relatively cool semiconductor surface maintained at temperature $T_C$, where $T_H > T_C$; and adjusting the spacing of the gap to the order of submicrons/microns to achieve an enhanced increase in the semiconductor generation of charged carriers in response to the radiation coupled through the gap, wherein the gap is isolated from vibration.

* * * * *